US011055800B2

(12) United States Patent
Singh (10) Patent No.: US 11,055,800 B2
(45) Date of Patent: Jul. 6, 2021

(54) METHODS OF VERIFYING THE ONBOARD PRESENCE OF A PASSENGER, AND RELATED WIRELESS ELECTRONIC DEVICES

(71) Applicant: Telcom Ventures, LLC, Miami, FL (US)

(72) Inventor: Rajendra Singh, Indian Creek Village, FL (US)

(73) Assignee: Telcom Ventures, LLC, Miami, FL (US)

( * ) Notice: Subject to any disclaimer, the term of this patent is extended or adjusted under 35 U.S.C. 154(b) by 477 days.

(21) Appl. No.: 15/840,831

(22) Filed: Dec. 13, 2017

(65) Prior Publication Data

US 2019/0172168 A1    Jun. 6, 2019

Related U.S. Application Data

(60) Provisional application No. 62/594,214, filed on Dec. 4, 2017.

(51) Int. Cl.
| | |
|---|---|
| *G06Q 50/26* | (2012.01) |
| *H04L 29/08* | (2006.01) |
| *G06Q 20/40* | (2012.01) |
| *H04W 4/02* | (2018.01) |
| *G06Q 50/30* | (2012.01) |

(52) U.S. Cl.
CPC ..... *G06Q 50/265* (2013.01); *G06Q 20/40145* (2013.01); *H04L 67/20* (2013.01); *H04L 67/24* (2013.01); *H04W 4/02* (2013.01); *G06Q 50/30* (2013.01)

(58) Field of Classification Search
CPC .......... G06Q 50/265; G06Q 20/40145; G06Q 50/30; H04L 67/20; H04L 67/24; H04W 4/02
See application file for complete search history.

(56) References Cited

U.S. PATENT DOCUMENTS

| | | | | |
|---|---|---|---|---|
| 6,119,096 | A * | 9/2000 | Mann | G06Q 20/341 |
| | | | | 705/5 |
| 8,328,094 | B2 * | 12/2012 | Proud | G06Q 50/14 |
| | | | | 235/383 |
| 8,604,901 | B2 * | 12/2013 | Hoyos | G06K 9/00885 |
| | | | | 340/5.52 |

(Continued)

OTHER PUBLICATIONS

"Mobile Passport Control", published by Flysfo.com, on Jul. 18, 2015, all pages (Year: 2015).*

(Continued)

*Primary Examiner* — Omar Zeroual
(74) *Attorney, Agent, or Firm* — Myers Bigel, P.A.

(57) ABSTRACT

Methods of verifying an onboard presence of a passenger of a transportation vehicle are provided. A method of verifying an onboard presence of a passenger of a transportation vehicle includes generating, via a wireless electronic device of the passenger while on board the transportation vehicle, different first and second data indicating the onboard presence of the passenger. Moreover, the method includes transmitting the different first and second data indicating the onboard presence of the passenger from the wireless electronic device to a server. Related wireless electronic devices, servers, and computer program products are also provided.

30 Claims, 7 Drawing Sheets

(56) References Cited

U.S. PATENT DOCUMENTS

| | | | | |
|---|---|---|---|---|
| 9,197,414 | B1* | 11/2015 | Martin | H04L 63/08 |
| 9,661,216 | B2* | 5/2017 | Tilt | H04N 5/23293 |
| 9,749,664 | B1* | 8/2017 | Watson | H04N 21/2187 |
| 10,650,621 | B1* | 5/2020 | King | H04L 67/10 |
| 2001/0016825 | A1* | 8/2001 | Pugliese, III | G07B 15/00 |
| | | | | 705/5 |
| 2003/0027551 | A1* | 2/2003 | Rockwell | B64D 11/00155 |
| | | | | 455/410 |
| 2003/0174049 | A1* | 9/2003 | Beigel | G06K 19/0723 |
| | | | | 340/10.42 |
| 2004/0142658 | A1* | 7/2004 | McKenna | H01Q 1/246 |
| | | | | 455/11.1 |
| 2005/0256724 | A1* | 11/2005 | Rasin | G07C 9/257 |
| | | | | 705/5 |
| 2006/0055512 | A1* | 3/2006 | Chew | G06K 9/00885 |
| | | | | 340/5.82 |
| 2006/0242027 | A1 | 10/2006 | Falic | |
| 2006/0245620 | A1 | 11/2006 | Roques et al. | |
| 2007/0046426 | A1* | 3/2007 | Ishibashi | G07C 9/257 |
| | | | | 340/5.52 |
| 2008/0227434 | A1* | 9/2008 | Nitta | H04W 60/00 |
| | | | | 455/414.1 |
| 2008/0302870 | A1* | 12/2008 | Berini | G07C 9/257 |
| | | | | 235/380 |
| 2009/0042557 | A1* | 2/2009 | Vardi | H04W 72/04 |
| | | | | 455/422.1 |
| 2009/0251282 | A1* | 10/2009 | Fitzgerald | G06F 21/88 |
| | | | | 340/5.31 |
| 2010/0308108 | A1* | 12/2010 | Choi | G07C 9/257 |
| | | | | 235/382 |
| 2011/0091092 | A1* | 4/2011 | Nepomniachtchi | |
| | | | | G06K 9/00463 |
| | | | | 382/139 |
| 2011/0177831 | A1* | 7/2011 | Huang | G01S 5/0252 |
| | | | | 455/457 |
| 2011/0288768 | A1* | 11/2011 | Stefani | G06Q 30/0281 |
| | | | | 701/533 |
| 2012/0144458 | A1* | 6/2012 | Mechaley, Jr. | G06F 21/43 |
| | | | | 726/5 |
| 2012/0150686 | A1* | 6/2012 | Aldomar | G06Q 10/087 |
| | | | | 705/26.41 |
| 2012/0181333 | A1* | 7/2012 | Krawczewicz | G06K 19/07749 |
| | | | | 235/380 |
| 2013/0079001 | A1* | 3/2013 | Edara | H04W 48/16 |
| | | | | 455/433 |
| 2013/0305059 | A1* | 11/2013 | Gormley | H04L 9/0866 |
| | | | | 713/189 |
| 2014/0018111 | A1* | 1/2014 | Farley | G01S 5/0252 |
| | | | | 455/456.6 |
| 2014/0156318 | A1 | 6/2014 | Behun et al. | |
| 2014/0244411 | A1* | 8/2014 | Kim | G06Q 20/3276 |
| | | | | 705/17 |
| 2014/0254693 | A1* | 9/2014 | Mitchell | H04B 3/54 |
| | | | | 375/257 |
| 2014/0278220 | A1* | 9/2014 | Yuen | A61B 5/02427 |
| | | | | 702/150 |
| 2014/0297067 | A1 | 10/2014 | Malay | |
| 2014/0380501 | A1* | 12/2014 | Niss | G06F 21/62 |
| | | | | 726/27 |
| 2015/0057925 | A1* | 2/2015 | Schreiber | G01S 19/258 |
| | | | | 701/491 |
| 2015/0088619 | A1* | 3/2015 | Larson | G06Q 30/0207 |
| | | | | 705/14.1 |
| 2015/0096813 | A1* | 4/2015 | Aumente | G07B 15/00 |
| | | | | 177/245 |
| 2015/0109428 | A1* | 4/2015 | Mechaley, Jr. | G06K 9/00288 |
| | | | | 348/77 |
| 2015/0142612 | A1* | 5/2015 | Hanna | G06Q 20/085 |
| | | | | 705/26.81 |
| 2015/0242832 | A1* | 8/2015 | Corritori | G06Q 10/0831 |
| | | | | 705/19 |
| 2015/0296450 | A1* | 10/2015 | Koo | H04W 48/16 |
| | | | | 455/435.3 |
| 2015/0373121 | A1* | 12/2015 | Secilmis | B64D 11/0015 |
| | | | | 455/41.2 |
| 2015/0380501 | A1 | 12/2015 | Koshi et al. | |
| 2016/0050203 | A1* | 2/2016 | Hefetz | H04L 63/0853 |
| | | | | 726/7 |
| 2016/0148449 | A1* | 5/2016 | God | G07C 9/257 |
| | | | | 340/5.6 |
| 2016/0189096 | A1* | 6/2016 | Tang | G01V 5/0033 |
| | | | | 705/332 |
| 2016/0286258 | A1* | 9/2016 | Rajagopal | H04N 21/2146 |
| 2016/0352412 | A1* | 12/2016 | Di Costanzo | G06F 8/61 |
| 2016/0364559 | A1* | 12/2016 | Bali | H04L 9/3231 |
| 2016/0368456 | A1* | 12/2016 | Outwater | B60R 25/24 |
| 2017/0063549 | A1* | 3/2017 | Zwart | G07C 9/257 |
| 2017/0068930 | A1* | 3/2017 | Attar | G06Q 10/087 |
| 2017/0161716 | A1* | 6/2017 | Hurley | G06Q 20/3224 |
| 2017/0180036 | A1* | 6/2017 | Schaupmann | H04N 7/183 |
| 2017/0193419 | A1* | 7/2017 | Haparnas | H04L 67/12 |
| 2017/0206345 | A1* | 7/2017 | LaCous | G06F 3/041 |
| 2017/0233098 | A1* | 8/2017 | Gerard | B64D 45/0015 |
| | | | | 348/159 |
| 2017/0278156 | A1* | 9/2017 | Parekh | G06Q 30/0607 |
| 2017/0302711 | A1* | 10/2017 | Velayudhan | H04N 21/433 |
| 2017/0372541 | A1* | 12/2017 | Attar | G07B 15/00 |
| 2018/0007137 | A1* | 1/2018 | Watson | H04L 63/1425 |
| 2018/0027037 | A1* | 1/2018 | Watson | H04L 67/2842 |
| | | | | 709/219 |
| 2018/0027070 | A1* | 1/2018 | Jhanji | H04L 67/1046 |
| | | | | 709/217 |
| 2018/0049250 | A1* | 2/2018 | Perng | H04L 67/34 |
| 2018/0098227 | A1* | 4/2018 | Carnelli | H04W 64/003 |
| 2018/0211527 | A1* | 7/2018 | Ishihara | H04W 4/026 |
| 2018/0234707 | A1* | 8/2018 | Pujia | H04N 21/4227 |
| 2019/0035042 | A1* | 1/2019 | Attar | G06Q 50/265 |
| 2019/0095942 | A1* | 3/2019 | Lee | G06Q 20/206 |
| 2019/0148025 | A1* | 5/2019 | Stone | G16H 20/17 |
| | | | | 705/2 |
| 2019/0230212 | A1* | 7/2019 | Spracklin | H04M 1/72463 |
| 2020/0042812 | A1* | 2/2020 | Sakaguchi | G06K 9/00288 |

OTHER PUBLICATIONS

A. Pozzebon, "The PITAGORA project: Near field communication to improve passenger experience in airports," 2017 IEEE International Conference on RFID Technology & Application (RFID-TA), Warsaw, 2017, pp. 63-68 (Year: 2017).*

J. L. Rogers, "Authenticating airline passengers," in IEEE Potentials, vol. 22, No. 1, pp. 33-35, Feb.-Mar. 2003 (Year: 2003).*

Notification of Transmittal of the International Search Report and the Written Opinion of the International Searching Authority, or the Declaration, in corresponding PCT Application No. PCT/US18/63282 (dated Feb. 6, 2019).

* cited by examiner

METHODS OF VERIFYING THE ONBOARD PRESENCE OF A PASSENGER, AND RELATED WIRELESS ELECTRONIC DEVICES

CLAIM OF PRIORITY

The present application claims the benefit of U.S. Provisional Patent Application Ser. No. 62/594,214, filed Dec. 4, 2017, entitled Methods of Verifying the Onboard Presence of a Passenger, and Related Wireless Electronic Devices, the disclosure of which is hereby incorporated herein in its entirety by reference.

FIELD

The present inventive concepts relate to communications systems, methods, and devices and, more particularly, to systems, methods, and devices that use communications to verify the physical presence of a person.

BACKGROUND

In many jurisdictions, an airplane passenger may be required to verify that the passenger was on board a particular flight from one jurisdiction to another jurisdiction, such as from one country to another country. For example, to qualify for duty-free shopping, a passenger may be required to present a boarding pass. Similarly, when flying from one country to another, a passenger may need to file, at an airport, a form to obtain a refund for the passenger's payment of a value-added tax.

SUMMARY

According to some embodiments of the present inventive concepts, methods of verifying an onboard presence of a passenger of a transportation vehicle are provided. The methods may include generating, via a wireless electronic device of the passenger while on board the transportation vehicle, different first and second data indicating the onboard presence of the passenger. Moreover, the methods may include transmitting the different first and second data indicating the onboard presence of the passenger from the wireless electronic device to a server.

In some embodiments, the transportation vehicle may be an aircraft, and the transmitting may be performed by the wireless electronic device while on board the aircraft. Additionally or alternatively, the first data indicating the onboard presence of the passenger may be boarding pass data, and the generating may include generating the boarding pass data by using a camera of the wireless electronic device. For example, the generating the boarding pass data may include scanning, via the camera of the wireless electronic device, a bar code or QR code of a physical boarding pass of the passenger. Additionally or alternatively, the generating the boarding pass data may include taking a photograph, via the camera of the wireless electronic device, of a physical boarding pass of the passenger. Moreover, the transmitting may include transmitting the photograph of the physical boarding pass of the passenger from the wireless electronic device to the server.

According to some embodiments, the second data indicating the onboard presence of the passenger may include an identification of a local-area-network access point that is on board the transportation vehicle, and the generating may include generating the identification of the local-area-network access point by using the wireless electronic device to access the local-area-network access point. For example, the local-area-network access point may include a Wi-Fi access point that is on board the transportation vehicle, and the generating may include generating an identification of the Wi-Fi access point by using the wireless electronic device to access a service provided via the Wi-Fi access point.

In some embodiments, the first data indicating the onboard presence of the passenger may include biometric data of the passenger, and the generating may include generating the biometric data by using a camera or other sensor of the wireless electronic device. Additionally or alternatively, the second data indicating the onboard presence of the passenger may include location data of the transportation vehicle, and the generating may include generating the location data of the transportation vehicle by using a Global Positioning System (GPS) receiver of the wireless electronic device. Moreover, the transportation vehicle may include an aircraft, and the location data may include altitude data of the aircraft. Furthermore, the transmitting may be performed by the wireless electronic device while bypassing any local area network of the aircraft, after the passenger disembarks from a flight of the aircraft.

According to some embodiments, the transportation vehicle may be an aircraft, the second data indicating the onboard presence of the passenger may include altitude data of the aircraft, and the generating may include generating the altitude data of the transportation vehicle by using a barometer of the wireless electronic device.

In some embodiments, the first data indicating the onboard presence of the passenger may include boarding pass data, and the second data indicating the onboard presence of the passenger may include an identification of a local-area-network access point that is on board the transportation vehicle. Moreover, the transmitting may include transmitting first and second time stamps indicating when the boarding pass data and the identification of the local-area-network access point, respectively, were generated by the wireless electronic device.

According to some embodiments, the first data indicating the onboard presence of the passenger may include boarding pass data, and the second data indicating the onboard presence of the passenger may include location data of the transportation vehicle. Moreover, the transmitting may include transmitting first and second time stamps indicating when the boarding pass data and the location data, respectively, were generated by the wireless electronic device.

In some embodiments, the methods may include initiating, via the wireless electronic device while at a first physical location including a store, a transaction to purchase one or more items from the store. Moreover, the methods may include completing, via the wireless electronic device while at a second physical location outside of the store, the transaction in response to verifying an identity and/or location of the passenger. The second physical location may include a location on board the transportation vehicle, and the verifying may include performing the generating and the transmitting.

According to some embodiments, the methods may include accessing, via a web page or an application that is resident on the wireless electronic device, a database to verify whether the passenger has purchased a maximum amount of duty-free purchases for a particular jurisdiction. Additionally or alternatively, the methods may include transmitting third data indicating that the passenger has arrived at a destination.

In some embodiments, a wireless electronic device may be configured to perform any combination or subcombination of the methods described herein. Additionally or alternatively, a computer program product may be provided that includes a non-transitory computer readable storage medium including computer readable program code therein that when executed by a processor causes the processor to perform any combination or subcombination of the methods described herein.

Wireless electronic devices, according to some embodiments of the present inventive concepts, may include a processor configured to generate different first and second data indicating a presence of a passenger on board a transportation vehicle. The wireless electronic devices may also include a transceiver configured to transmit the different first and second data indicating the presence of the passenger from the wireless electronic device to a server. Moreover, the wireless electronic devices may include a camera, and the processor may be further configured to generate the first data by using the camera to capture an image of a boarding pass of the passenger. Analogous methods and/or computer program products also may be provided.

Methods of verifying, via a server, according to some embodiments of the present inventive concepts, an onboard presence of a passenger of a transportation vehicle may be provided. The methods may include receiving at the server, from a wireless electronic device of the passenger, different first and second data indicating the onboard presence of the passenger. The methods may include processing the different first and second data at the server. Moreover, the methods may include transmitting a result of the processing from the server to a third party. Analogous servers, wireless electronic devices, and/or computer program products also may be provided.

In some embodiments, the processing may include comparing the different first and second data with predetermined values corresponding to the transportation vehicle. Additionally or alternatively, the transmitting may include transmitting an authorization to complete a transaction to purchase one or more items initiated via the wireless electronic device at a physical store. Moreover, the methods may include receiving at the server, from the wireless electronic device of the passenger, third data indicating that the passenger has arrived at a destination. Analogous servers, wireless electronic devices, and/or computer program products also may be provided.

According to some embodiments, a server may configured to perform any combination or subcombination of the methods of verifying, via a server, the onboard presence of the passenger of the transportation vehicle described herein. Additionally or alternatively, a computer program product may be provided that includes a non-transitory computer readable storage medium including computer readable program code therein that when executed by a processor causes the processor to perform any combination or subcombination of the methods described herein. Analogous wireless electronic devices and/or methods also may be provided.

DETAILED DESCRIPTION

Example embodiments of the present inventive concepts now will be described with reference to the accompanying drawings. The present inventive concepts may, however, be embodied in a variety of different forms and should not be construed as limited to the embodiments set forth herein. Rather, these embodiments are provided so that this disclosure will be thorough and complete, and will fully convey the scope of the present inventive concepts to those skilled in the art. In the drawings, like designations refer to like elements.

Some embodiments of the present inventive concepts provide for verification that a person was on board a flight, without requiring a check at an airport gate or checking/accessing (e.g., consulting/inquiring) any passenger log data.

Figure 1:
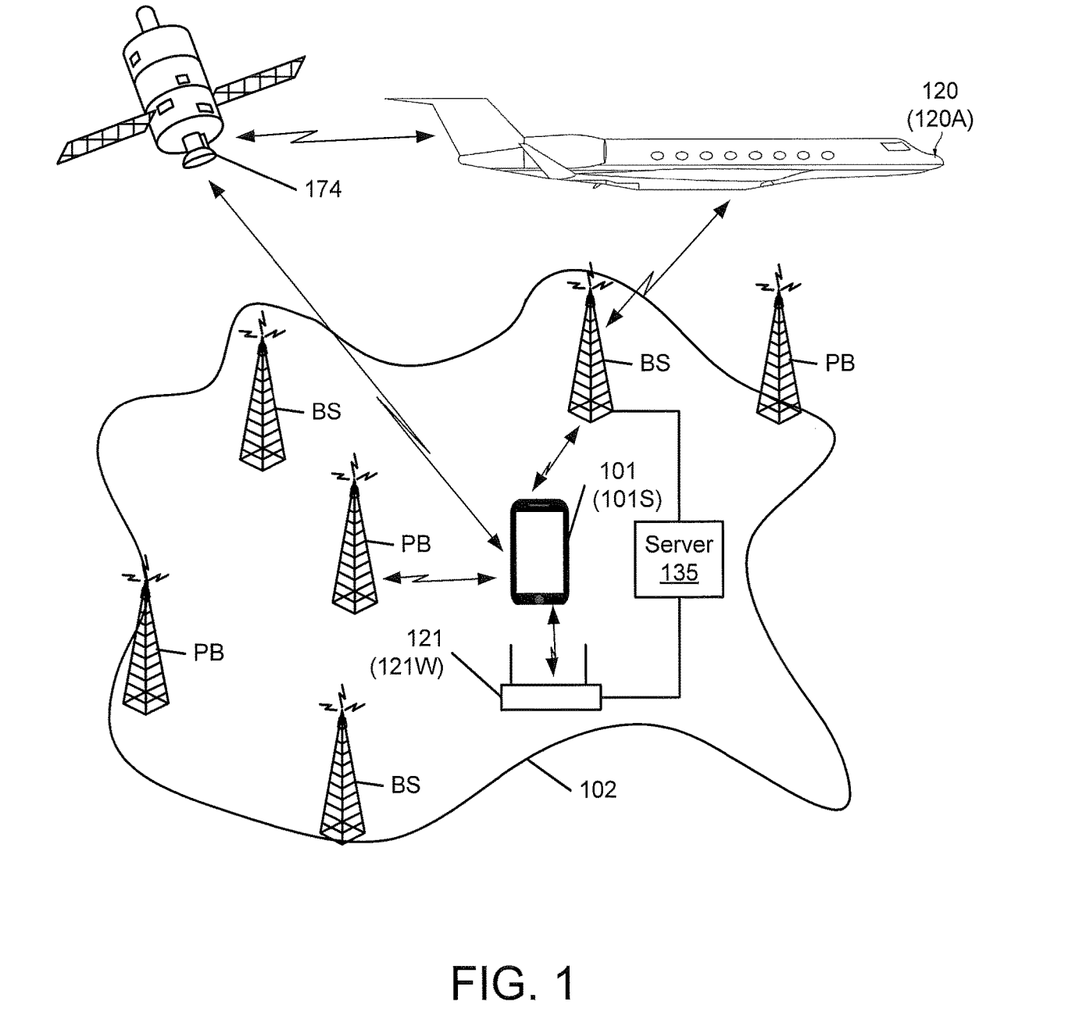
FIG. 1 is a schematic diagram illustrating a geographical area that includes a wireless electronic device, according to some embodiments of the present inventive concepts.

Referring to FIG. 1, a wireless electronic device 101 is illustrated in a geographical area 102. The wireless electronic device 101 may be (or may be a part of) one of various types of wireless electronic user devices, including mobile/cell phones, as well as wireless user devices without phone capabilities. For example, the wireless electronic device 101 may be a smartphone 101S, a laptop computer, a tablet computer, or any other portable, wireless electronic device with communications capability. The wireless electronic device 101 can be located anywhere inside the geographical area 102. Moreover, the wireless electronic device 101 can, in some embodiments, be located inside an aircraft 120A (or other transportation vehicle 120). Although FIG. 1 illustrates a single wireless electronic device 101, a plurality of wireless electronic devices 101 may be located inside the geographical area 102 or inside the aircraft 120A. As an example, in some embodiments, hundreds, thousands, or more wireless electronic devices 101 may be located inside the geographical area 102.

The wireless electronic device 101 may wirelessly receive signals from transmitters such as a Base Station (BS)(e.g., a cellular BS), a satellite, and/or a Positioning Beacon (PB) of a Terrestrial Beacon Network (TBN). It will be understood that the geographical area 102 may include any number of (e.g., three, four, dozens, or more) BSs and/or PBs. Moreover, the wireless electronic device 101 may receive signals from a Wi-Fi hot spot 121W (or other local-area-network access point 121) in the geographical area 102 (or in the aircraft 120A) and/or a GPS network 174. Accordingly, it will be understood that the physical presence (e.g., location/position) of the wireless electronic device 101 may be determined using signals to/from the BSs, PBs, the Wi-Fi hot spot 121W, and/or the GPS network 174. For example, in some embodiments, a server 135 (or other remote computer/processor) that is communicatively connected to a BS and/or Wi-Fi hot spot 121W may process data regarding the physical presence of the wireless electronic device 101.

In some embodiments of the present inventive concepts, a resident (and/or a remote, cloud-based) application used by a smartphone 101S (or other wireless electronic device 101 with communications capability) may scan, or take a photo of, a passenger's boarding pass for a flight. The scan or photo may be initiated by the passenger or can be automatic (e.g., can be initiated by the application resident on the smartphone 101S). For example, an image of the boarding pass may be captured while the passenger is on board the flight for which the boarding pass is required.

The application resident on the smartphone 101S may transmit information generated by scanning or photographing a physical (e.g., paper) boarding pass. For example, if the scan is a barcode scan or QR code scan, then data generated by the scan may be transmitted. If, on the other hand, a photo of the boarding pass is taken, then the photo may be transmitted.

The application may also transmit an identification of an access point 121, such as a Wi-Fi access point 121W or other local-area-communication access point that is used by the smartphone 101S while on board the flight. The identification may include, for example, a Media Access Control address (MAC address) of the access point 121 and/or a Service Set Identifier (SSID) of the access point 121. By transmitting boarding pass data and an identification of an access point 121 that is on board the flight, the passenger's physical presence on board the flight can be verified via the smartphone/device application. This is one example of transmitting two different data indicating onboard presence to provide two-factor (or as a part of providing other multi-factor, such as three-factor) authentication.

Additionally or alternatively, if no local-area-communication method is available, then the smartphone/device application may determine its location/altitude using Global Positioning System (GPS) capability (e.g., GPS hardware and/or software) of the smartphone 101S. For example, the smartphone 101S may include a GPS receiver that is configured to determine the location/altitude while the passenger is onboard the aircraft 120A.

The boarding pass data and access point identification (e.g., MAC address and/or SSID) may be transmitted by the smartphone/device application to a server 135 (e.g., at a data center) to provide verification of the passenger's presence on board the flight. The transmission to the server 135 may be completed while the passenger is on board the flight or, if communications are not available on the flight, after the flight (e.g., after disembarkation of the flight). Some local-area-networks, such as Wi-Fi, may not allow the application to transmit data. As long as the application has a time stamp of the boarding pass data and the access point data (or GPS location/altitude) that can be stored via the application, a verification can be performed. After the server 135 processes/performs the verification, it may transmit the result to a third-party, such as an airline, a duty-free shopping merchant, or an organization that provides value-added tax refunds.

Figure 2A:
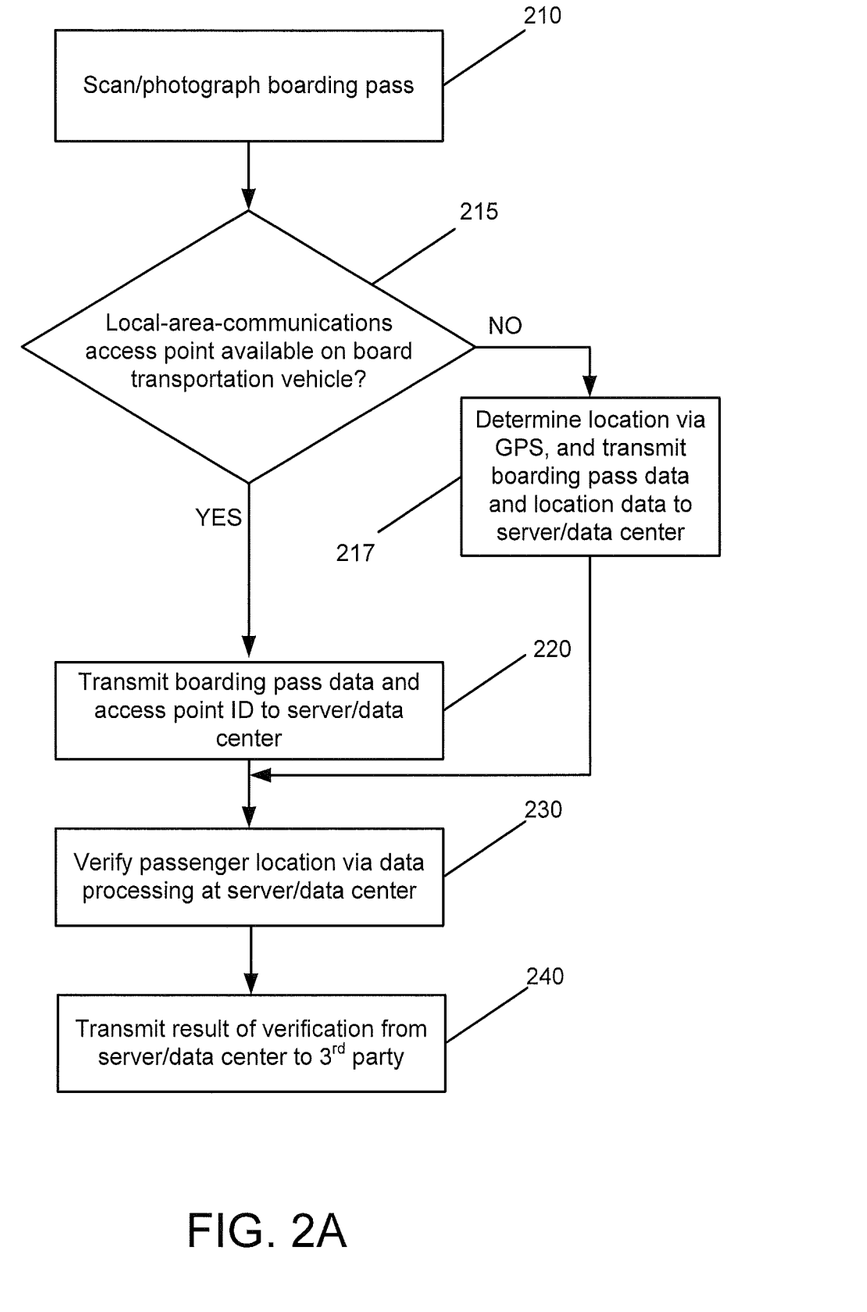
FIGS. 2A, 2B, and 2C are flowcharts illustrating operations of verifying the identity and/or location of a passenger of a transportation vehicle, according to some embodiments of the present inventive concepts.

Referring to FIG. 2A, a flowchart is provided illustrating operations of verifying an onboard presence of a passenger of a transportation vehicle 120, such as the aircraft 120A, according to the present inventive concepts. As the passenger is the user/owner of the wireless electronic device 101 (e.g., a smartphone 101S), verifying the onboard presence of the wireless electronic device 101 may provide a verification of the onboard presence of the passenger.

As shown in FIG. 2A, the wireless electronic device 101 may scan or photograph (Block 210) a boarding pass of the passenger while onboard the transportation vehicle 120. As a result, the wireless electronic device 101 may generate data indicating the onboard presence of the passenger. The wireless electronic device 101 may generate additional, different data indicating the onboard presence of the passenger by connecting to a local-area-network access point 121, such as a Wi-Fi hot spot 121W that is on board the transportation vehicle 120. The additional, different data may be an identification/identifier (ID) of the access point 121. For example, the ID of the access point 121 may be a predetermined ID, such as a MAC address and/or an SSID, that is known/stored by a server 135. Accordingly, operations described herein of "generating" an ID may refer to copying/storing a predetermined ID at the wireless electronic device 101 before transmitting the ID. The access point ID transmitted by the wireless electronic device 101 can then be compared (e.g., by a server 135) with a known/stored access point ID to verify the presence of the wireless electronic device 101 on board the transportation vehicle 120 having the access point 121.

When the access point 121 is inside an aircraft 120A, a person outside of the aircraft 120A may not be able to connect to the access point 121, as a network/service provided via the access point 121 may not become enabled/accessible until wireless electronic devices 101 are approved for use after take-off (and/or after reaching a threshold altitude, such as 10,000 feet or higher) of the aircraft 120A. This may ensure that a passenger using the wireless electronic device 101 to connect to the access point 121 is on board (and not merely nearby) the aircraft 120A. In some embodiments, a provider of a Wi-Fi service that is accessible via a Wi-Fi access point 121W on an aircraft 120A may have an agreement/contract with an airline to allow passengers to connect with, and transmit data indicating the passengers' onboard presence through, the Wi-Fi access point 121W, at no additional charge to the passengers.

Additionally or alternatively, a passenger's onboard presence can be verified by providing (i) GPS/altitude data, (ii) data indicating that the aircraft 120A is in/above a jurisdiction different from that of the take-off location, and/or (iii) a time stamp indicating when the wireless electronic device 101 accessed the access point 121, in addition to (or as an alternative to) providing an ID of the access point 121. For example, when the ID of an access point 121 is provided by a passenger as part of the multi-factor authentication described herein, the multi-factor authentication may use at least three factors.

In some embodiments, the generation of data can be prompted by an application resident on the wireless electronic device 101. For example, upon starting/opening the application, the application may automatically initiate camera functionality of the wireless electronic device 101 and/or may prompt the passenger to scan/photograph the boarding pass via the wireless electronic device 101. Additionally or alternatively, the application may prompt the passenger to provide one or more other identifying data via user input(s). As an example, the application may prompt the passenger to provide a face scan or a fingerprint scan.

After the operation(s) of Block 210, the wireless electronic device 101 may then transmit (Block 220) the boarding pass data and the access point ID to a server 135 (e.g., at a data center), if the access point 121 is available on board the transportation vehicle 120 (Block 215). For example, the wireless electronic device 101 may generate/store the access point ID in response to using the wireless electronic device 101 to access a service (e.g., an in-flight entertainment and/or shopping service) that is provided via the access point 121.

In some embodiments, the transmitting (Block 220) operation(s) may be performed while the passenger is on board the transportation vehicle 120, such as via the access point 121. Alternatively, the transmitting (Block 220) operation(s) may be performed while bypassing any local area network (including bypassing the access point 121) of the aircraft 120A, after the passenger completes a flight of the aircraft 120A. Moreover, although Block 220 illustrates transmitting boarding pass data and an access point ID, it will be understood that other examples of different first and second data indicating the onboard presence of the passenger may be transmitted from the wireless electronic device 101 to the server 135.

For example, if the access point 121 is not available (Block 215), then the wireless electronic device 101 may determine (Block 217) its location via GPS, and may transmit the boarding pass data and location data to the server 135. Other examples of data indicating the onboard presence of the passenger include facial recognition of the passenger, fingerprint recognition of the passenger, and the speed (i.e., velocity) of the transportation vehicle 120 as measured by the wireless electronic device 101 (e.g., by accelerometer(s)/gyroscope(s) 359 (FIG. 3) therein). As an example, the measured speed of the aircraft 120A while airborne should exceed the speed of a car or a train, and thus can be used (e.g., by comparing with a predetermined threshold value) to verify that the passenger is airborne. Furthermore, in some embodiments, the transmitting operations of Blocks 217 and 220 may include transmitting respective time stamps indicating when the different data were generated by wireless electronic device 101, thus further verifying that the passenger was airborne when the data were generated.

After the wireless electronic device 101 performs the operations of Blocks 210-220, the server 135/data center, which may include one or more remote computers/processors, may perform the operations of Blocks 230 and 240. In particular, upon receiving the different data indicating the onboard presence of the passenger, the server 135 may process (Block 230) the different data at the server 135. For example, the server 135 may compare the different data with predetermined values corresponding to the transportation vehicle 120. As an example, the server 135 may compare the different data with flight data, such as a flight path/altitude, of an aircraft 120A, or with other expected values for the aircraft 120A. The result of the processing/verification (Block 230) may then be transmitted (Block 240) from the server 135 to a third party. By this result (e.g., YES or NO), the server 135 indicates to the third party whether the passenger is physically present onboard the transportation vehicle 120.

Accordingly, the server 135 may perform a check on the boarding pass data and the access point data (or GPS location/altitude) and may confirm that the passenger is/was on board the particular flight. Such data can be used by providers of any relevant business, such as duty-free shopping, or by organizations that use such verification for value-added tax refunds or any relevant legal use.

In addition to, or as an alternative to, checking/using an access point 121 that is on board the transportation vehicle 120, the arrival of the passenger at a destination can be confirmed via the passenger's wireless electronic device 101 after disembarking the transportation vehicle 120. For example, the passenger's boarding pass (e.g., an electronic and/or physical/paper boarding pass) may indicate a departing airport and an arrival airport, and an application resident on the passenger's wireless electronic device 101 can check/access one or more Wi-Fi access points 121W (and, in some embodiments, can transmit ID(s) thereof) at the arrival airport to confirm that the passenger has arrived at the destination. In some embodiments, the passenger's wireless electronic device 101 may also check/access one or more Wi-Fi access points 121W at the departing airport to identify the passenger's presence/location before departing for the destination.

Such checking/accessing of Wi-Fi access points 121W at the arrival airport and/or the departing airport may be performed via a database, such as an application database that the resident application has stored or a remote/outsourced database of access point 121 identifiers that the wireless electronic device 101 can check. For example, the application database may list Wi-Fi access points 121W that the wireless electronic device 101 has actively/physically checked/accessed and/or may list Wi-Fi access points 121W that are known to be at a particular location. In some embodiments, the resident application may compare the Wi-Fi access point(s) 121W accessed by the wireless electronic device 101 with the known Wi-Fi access points 121W.

Moreover, the passenger can input (e.g., in response to a prompt/request from the resident application) biometric data, such as via a fingerprint scan or a face scan, at the departing airport and/or the arrival airport, to confirm that another person is not using the wireless electronic device 101 and/or the boarding pass. Additionally or alternatively, the wireless electronic device 101 may submit a time stamp indicating when the passenger is/was at the departing airport and/or the arrival airport.

Figure 2B:
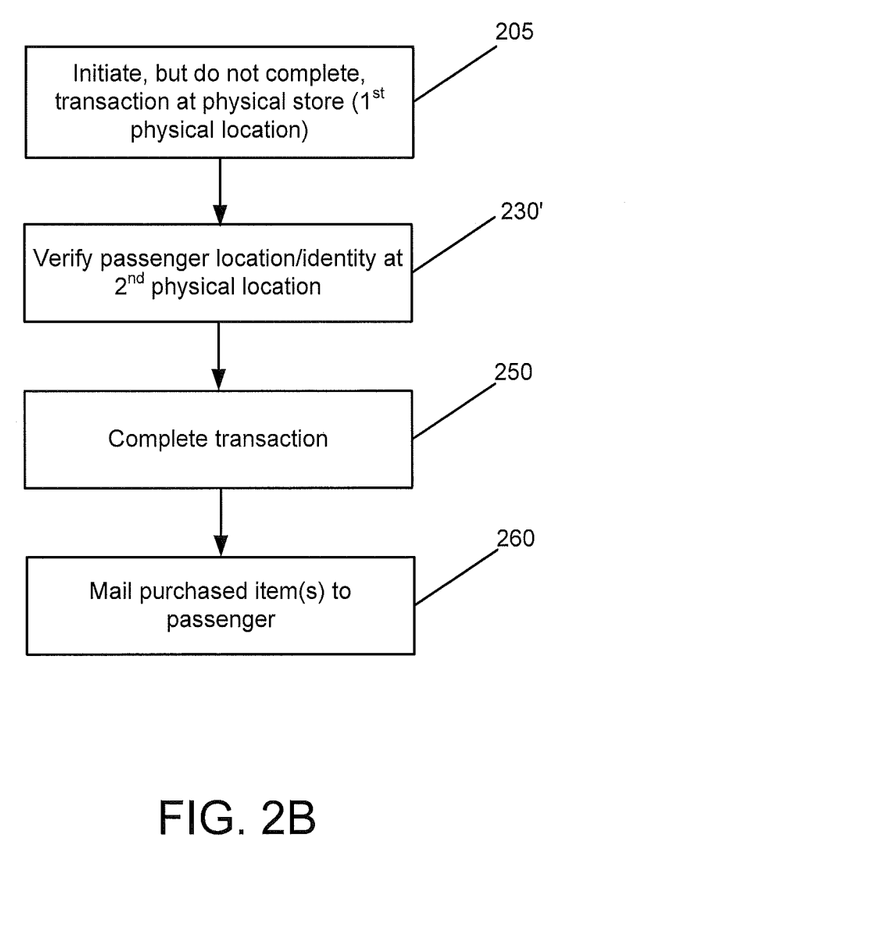

Referring to FIG. 2B, a flowchart is provided illustrating operations of authorizing a transaction by a passenger in response to verifying the identity and/or location of the passenger. The passenger may initiate (Block 205) a transaction, such as a purchase of an item (or items), at a first physical location that is a physical store, such as a duty-free shop at an airport. The initiation (Block 205) may be performed via the passenger's wireless electronic device 101, such as by a mobile payment application running on the wireless electronic device 101 while within close/short-range communications distance with a mobile payment (i.e., point-of-sale) terminal/reader at the physical store. In particular, the initiation (Block 205) may be performed between the wireless electronic device 101 and the mobile payment terminal/reader via a close/short-range first air interface (e.g., an NFC interface), in response to the wireless electronic device 101 satisfying a proximity criterion with respect to (e.g., by being moved within a few centimeters of) the mobile payment terminal/reader.

The transaction may then be authorized by verifying (Block 230') the passenger's identity and/or location while the wireless electronic device 101 is in a distinct, separate second physical location/jurisdiction from the first physical location. For example, a passenger may initiate (Block 205) the transaction based on the proximity of the passenger's wireless electronic device 101 to a point-of-sale device at a duty-free shop in a first jurisdiction. The passenger may then authorize/verify (Block 230') the transaction in a different, remote second jurisdiction by confirming arrival at the second jurisdiction. The passenger may confirm arrival by (i) connecting the wireless electronic device 101 to, and identifying (e.g., transmitting an ID of), an access point 121 at an arrival airport, by (ii) transmitting a GPS location from the second jurisdiction, and/or by (iii) transmitting biometric data and/or a time stamp from the second jurisdiction.

As an example, the verifying operation(s) of Block 230' may be the operations of Blocks 210-240 of FIG. 2A. Accordingly, the operation(s) of Block 205 may precede/trigger those of Blocks 210-240. Moreover, in some embodiments, the jurisdiction (e.g., country) of the second physical location may be the same as that of the first physical location as long as the second physical location is outside of the physical store. Alternatively, the second physical location may only be an airborne location or a location in a different country from the physical store.

An example of the operations of Blocks 205 and 230' is that a passenger may walk into a duty-free shop at an airport and initiate (Block 205) a purchase using the passenger's smartphone 101S at the point of sale. At this stage (Block 205), the transaction has been initiated but not completed. The passenger may also provide the mailing address where the purchased item(s) is to be mailed when the transaction in complete. After initiating (Block 205) the transaction at the first physical location, the passenger travels to a second physical location (e.g., an airborne location and/or another country), where the passenger's location (determined based on the smartphone 101S via local area access point(s) 121/GPS) and/or identity can be verified (Block 230'). Moreover, in some embodiments (e.g., in certain jurisdictions), the passenger may be required to scan a boarding pass at the new/second physical location, thus further increasing the verification accuracy. Additionally or alternatively, the passenger may be required to scan the boarding pass at the mailing address of delivery of the purchased item(s) and/or to provide local area access point verification at that point. All of the verification data may be provided by the passenger via an application of the smartphone 101S.

Based on this verification (Block 230'), which may be processed by a server 135 (e.g., a server of the duty-free shop or a third party), the transaction is deemed completed (Block 250) and the purchased item(s) can be mailed (Block 260) to the passenger directly, thus providing a duty-free direct shipping service. Furthermore, the operations of FIG. 2B may, in some embodiments of the present inventive concepts, be performed independently of the presence of the passenger on board a transportation vehicle 120.

Figure 2C:
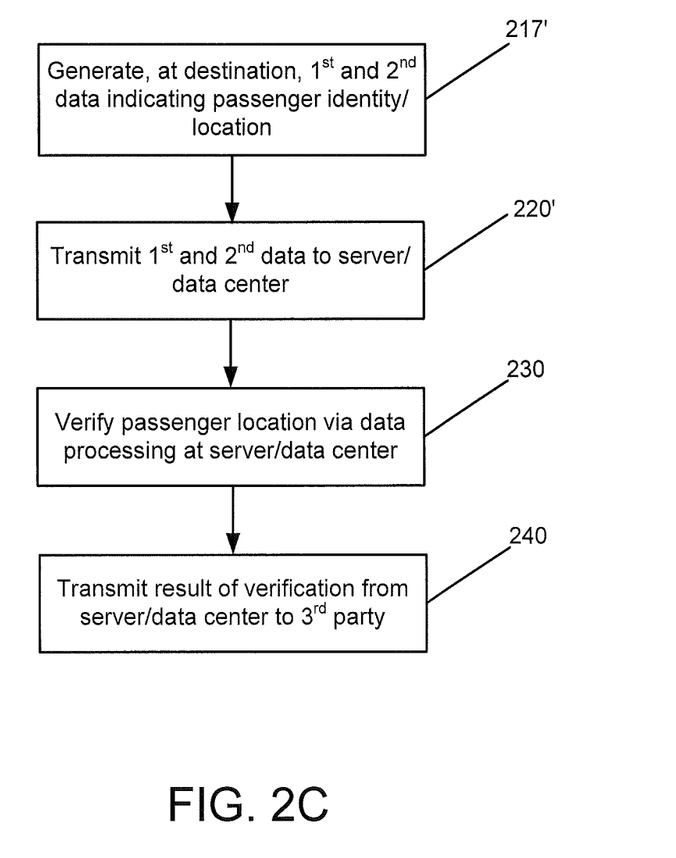

Moreover, referring to FIG. 2C, a flowchart is provided illustrating operations for confirming the arrival of a passenger at a destination of a transportation vehicle 120, independently of identifying/confirming the presence of the passenger on board the transportation vehicle 120. The method may include generating (Block 217'), via a wireless electronic device 101 of the passenger while at the destination, different first and second (or more) data indicating the identity and/or location of the passenger. For example, the different first and second data may be biometric data and location data, respectively. As an example, the location data may include GPS data and/or data identifying an access point 121 at the destination. The method may also include transmitting (Block 220') the different first and second data indicating the identity and/or location of the passenger from the wireless electronic device 101 to a server 135 (and/or a data center).

The operations of Blocks 217' and 220' may be performed without identifying/confirming the onboard presence of the passenger and/or without using boarding pass data. Accordingly, although some embodiments herein describe onboard presence and boarding pass data, the present inventive concepts are not limited to onboard presence and boarding pass data. After performing the operations of Blocks 217' and 220', the operations of Blocks 230 and/or 240 of FIG. 2A may be performed.

Figure 3:
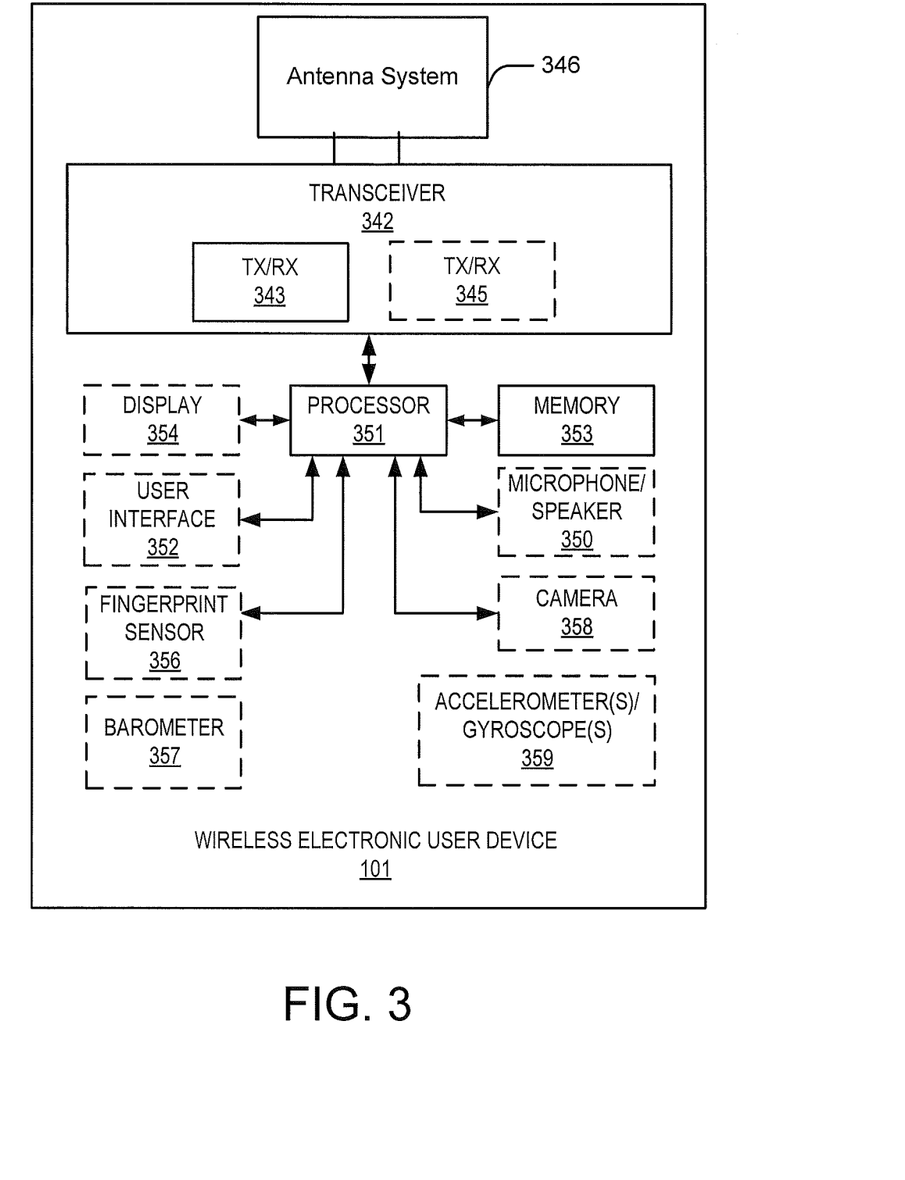
FIG. 3 is a block diagram of a wireless electronic device, according to some embodiments of the present inventive concepts.

Referring to FIG. 3, a block diagram is provided of a wireless electronic device (or "wireless electronic user device") 101, such as a smartphone 101S, according to some embodiments. As illustrated in FIG. 3, a wireless electronic device 101 may include an antenna system 346, a transceiver 342, a processor (e.g., processor circuit) 351, and a memory 353. Moreover, the wireless electronic device 101 may optionally include a display 354, a user interface 352, a microphone/speaker 350, one or more accelerometers/gyroscopes 359, a camera 358, a barometer 357, and/or a fingerprint (or other biometric) sensor 356.

A transmitter portion of the transceiver 342 may convert information, which is to be transmitted by the wireless electronic device 101, into electromagnetic signals suitable for radio communications. A receiver portion of the transceiver 342 may demodulate electromagnetic signals, which are received by the wireless electronic device 101 (e.g., from one of the transmitters illustrated in FIG. 1). The transceiver 342 may include transmit/receive circuitry (TX/RX) that provides separate communication paths for supplying/receiving RF signals to different radiating elements of the antenna system 346 via their respective RF feeds. Accordingly, when the antenna system 346 includes two active antenna elements, the transceiver 342 may include two transmit/receive circuits 343, 345 connected to different ones of the antenna elements via the respective RF feeds. For example, the transmit/receive circuit 343 may be connected to a Wi-Fi antenna or a close/short-range (e.g., a Near-Field Communication (NFC) or BLUETOOTH®) antenna, whereas the transmit/receive circuit 345 may be connected to a cellular antenna. Moreover, the antenna system 346/transceiver 342 may include a GPS receiver.

Referring still to FIG. 3, the memory 353 can store computer program instructions that, when executed by the processor circuit 351, carry out operations of the wireless electronic device 101. Additionally or alternatively, the server 135 may include a memory 353 that can store computer program instructions that, when executed by a processor circuit 351 of the server 135, carry out operations of the server 135. In some embodiments, the memory 353 can be a non-transitory computer readable storage medium including computer readable program code therein that when executed by the processor 351 causes the processor 351 to perform a method described herein. As an example, the memory 353 can store the resident application described herein, which can perform the operations illustrated in Blocks 210-220 of the flow chart of FIG. 2A. The memory 353 can be, for example, a non-volatile memory, such as a flash memory, that retains the stored data while power is removed from the memory 353.

Figure 4:
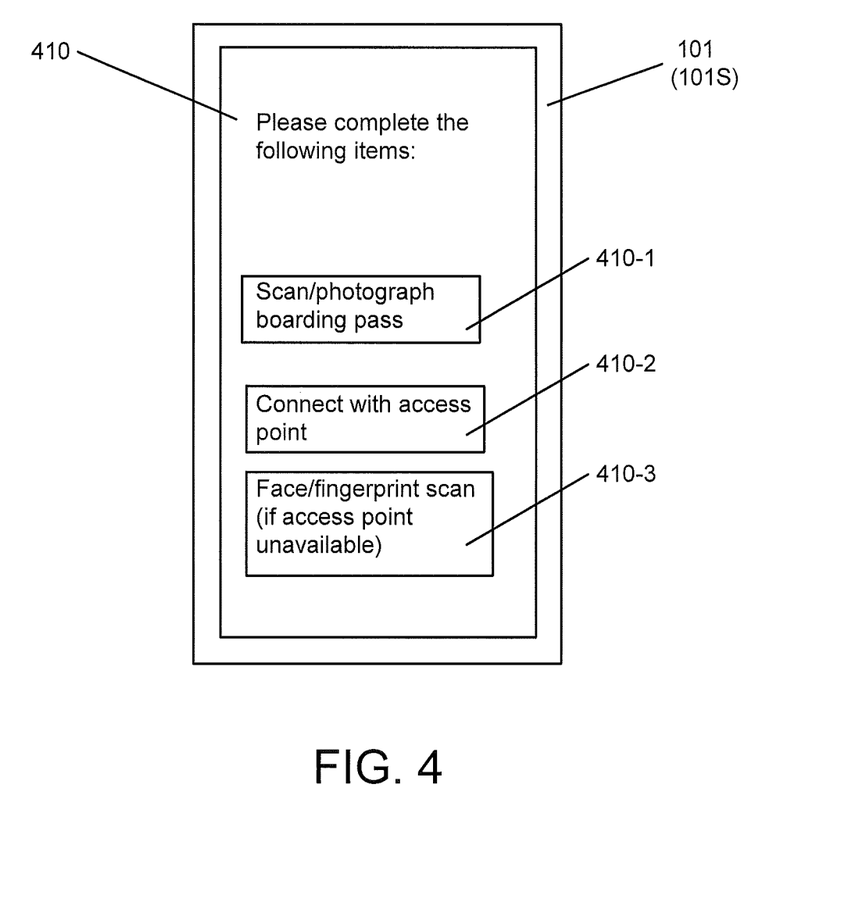
FIG. 4 is a diagram of a graphical user interface of a wireless electronic device, according to some embodiments of the present inventive concepts.

Referring to FIG. 4, a diagram of a Graphical User Interface (GUI) 410 of a wireless electronic device 101 (e.g., a smartphone 101S) is provided, according to some embodiments. The GUI 410 illustrates an web page or resident application that facilitates (e.g., guides the passenger through) the operations of Blocks 210-220 of FIG. 2A. For example, FIG. 4 shows that the web page or resident application may prompt the passenger to scan/photograph the passenger's boarding pass. As an example, the GUI 410 may display a user-selectable button 410-1 that initiates camera functionality to scan/photograph the boarding pass. Alternatively, camera functionality to scan/photograph the boarding pass may be automatically initiated upon opening/starting the web page or resident application, and the button 410-1 may be omitted.

In addition to the button 410-1, the GUI 410 may display a user-selectable button 410-2 that initiates connecting/communicating with a local area access point 121 and storing an ID of the local area access point 121. Alternatively, connecting/communicating with the local area access point 121 and storing its ID may be automatically initiated upon opening/starting the web page or resident application, and the button 410-2 may be omitted. Moreover, in some embodiments, the web page or resident application may cause the wireless electronic device 101 to automatically connect/communicate with the local area access point 121 and transmit the boarding pass data and access point ID to a server 135, in response to scanning/photographing the boarding pass and/or in response to opening/starting the web page or resident application.

In some embodiments, the GUI 410 may display a user-selectable button 410-3 that initiates a face scan or a fingerprint scan of the passenger. For example, if accessing an ID of the local area access point 121 is not available, or if data transmissions by the wireless electronic device 101 via the local area access point 121 are not available, then the passenger may select the button 410-3. Moreover, in some embodiments, the button 410-2 may be automatically omitted if accessing an ID of the local area access point 121 is not available or if data transmissions by the wireless electronic device 101 via the local area access point 121 are not available.

It will be understood that the buttons 410-1, 410-2, and 410-3 may be selected via user inputs by the passenger, such as via inputs to a touchscreen of the wireless electronic device 101. In some embodiments, other user inputs, such as inputs via a stylus, cursor, or keypad, may be used.

Additionally or alternatively, a passenger of a flight may order/purchase items via a web page or resident application that is accessed by the wireless electronic device 101. Accordingly, the GUI 410 may display user-selectable options for purchasing items, such as duty-free items. In some cases, the passenger may attempt to unlawfully purchase multiple (i.e., two or more) items via the web page or resident application. In particular, the passenger may attempt to use the web page or resident application (e.g., by using the web page or resident application repeatedly for purchases) to circumvent rules/systems and take items in excess of an amount allowed by a particular jurisdiction's customs.

This may be a problem for certain jurisdictions. This problem can be solved, however, in cooperation with duty-free shops (or bonded warehouses for duty-free export). For example, the web page or resident application can access a database of an airport/airline duty-free shop to verify that the passenger exporting (or entity exporting on behalf of the passenger) has not already purchased a maximum amount (e.g., has not exceeded personal-use quantities of duty-free merchandise) allowed by a certain (i.e., particular) jurisdiction. As an example, the operations of Blocks 220, 220', 230, and/or 230' of FIGS. 2A-2C may include accessing, via the web page or resident application, the database to verify whether the passenger has purchased the maximum amount. If the maximum amount has already been purchased, then the web page or resident application may block subsequent purchases for that passenger. Accordingly, the web page or resident application can provide safeguards against excess duty-free purchases.

Figure 5:
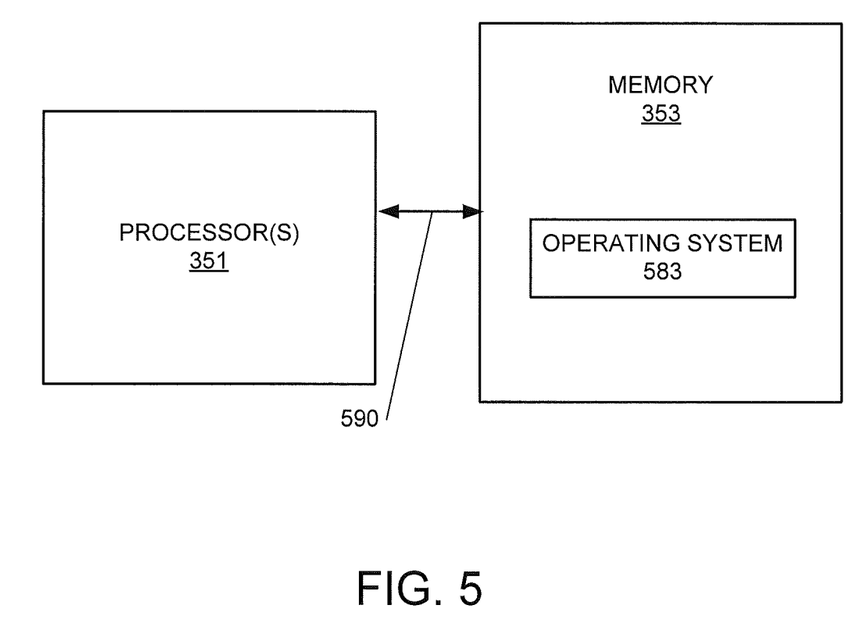
FIG. 5 is a block diagram of an example processor and memory that may be used in accordance with embodiments of the present inventive concepts.

FIG. 5 illustrates a block diagram of an example processor 351 and memory 353 that may be used in accordance with various embodiments of the present inventive concepts. The processor 351 communicates with the memory 353 via an address/data bus 590. The processor 351 may be, for example, a commercially available or custom microprocessor. Moreover, the processor 351 may include multiple processors. The memory 353 is representative of the overall hierarchy of memory devices containing the software and data used to implement various functions as described herein. The memory 353 may include, but is not limited to, the following types of devices: cache, ROM, PROM, EPROM, EEPROM, flash, Static RAM (SRAM), and Dynamic RAM (DRAM).

Referring to FIG. 5, the memory 353 may hold various categories of software and data, such as an operating system 583. The processor 351 and memory 353 may be part of a wireless electronic device 101 or a server 135. Accordingly, the operating system 583 can control operations of the wireless electronic device 101 or the server 135. In particular, the operating system 583 may manage the resources of the wireless electronic device 101 or the server 135 and may coordinate execution of various programs (e.g., a resident application described herein) by the processor 351.

Embodiments described herein can greatly enhance (e.g., by simplifying) the duty-free shopping experience. Moreover, a passenger does not have to carry duty-free shopping items on board a flight. Rather, such items can be delivered directly to an address (e.g., a residential or business address) of the passenger's choosing.

Although the use of a boarding pass and a local area access point identification (e.g., identification of on board Wi-Fi), and respective time stamps by a smartphone 101S, provides one example of the present inventive concepts, the present inventive concepts are not limited thereto. Rather, other forms of identifying the passenger can be used instead of the boarding pass. For example, biometrics such as fingerprint recognition and/or facial recognition can be used in the place of the boarding pass. As another example, as smartphones 101S may have a built-in barometer 357, such a barometer 357 can be used to measure altitude/change in altitude and thus can provide another way to verify whether a person is airborne.

Nor are the present inventive concepts limited to duty-free shopping. Rather, some embodiments may be used to enhance (e.g., simplify) security protocols. For example, airlines may wish to verify that the respective owners of checked bags on an aircraft 120A are on board. If a passenger is not present on the aircraft 120A, then any bag checked by the passenger may be removed or blocked from loading. Accordingly, the present inventive concepts herein may be applied to airline security protocols to improve efficiency and/or effectiveness.

The following are non-limiting examples/use-cases of the present inventive concepts:

1. A passenger of a transportation vehicle 120 (e.g., an aircraft 120A) can qualify for duty-free shopping without presenting a boarding pass at an airport for purchased duty-free merchandise. This can be accomplished by verifying, via the two-factor authentication described herein, that the passenger was on board a particular flight from one jurisdiction to another jurisdiction.

2. A passenger of an aircraft 120A can obtain a refund for the passenger's payment of a value-added tax without filing, at an airport, a form to obtain the refund. This can be accomplished by verifying, via the two-factor authentication described herein, that the passenger was on board a particular flight from one jurisdiction to another jurisdiction.

3. An airline, and/or a security agency, can verify that an owner of one or more checked bags (i.e., checked luggage) is on board the aircraft 120A for which the bag(s) have been checked. This can be accomplished by verifying, via the two-factor authentication described herein, whether the passenger is on board the aircraft 120A.

4. A passenger of an aircraft 120A can initiate, without completing, a purchase via a smartphone 101S at a point-of-sale in a duty-free shop at an airport. The purchase can subsequently be completed at a different physical location based on verification of the passenger's identity and/or location, via the two-factor authentication described herein.

5. A jurisdiction can safeguard against excess duty-free purchases by verifying, when a passenger attempts to purchase duty-free merchandise remotely via a web page or resident application of a wireless electronic device 101, whether the passenger has already purchased a maximum amount of duty-free merchandise for that jurisdiction.

6. The arrival of a passenger at a destination (e.g., an arrival airport) can be confirmed. For example, when a minor is escorted aboard an aircraft 120A, the present inventive concepts can be used to confirm that the minor has arrived at the destination after disembarking the aircraft 120A. As another example, the present inventive concepts can be used for immigration purposes to confirm that a person has exited one country and/or entered another country. In instances where the passenger has visitor status in a country, or otherwise should only have a limited-duration stay in the country, a resident application of a wireless electronic device 101 of the passenger can check/verify after a predetermined duration whether the passenger has exited the country. In some examples, authorities can require that the passenger download the resident application and transmit confirmation of an exit of the jurisdiction.

Moreover, although some examples herein discuss the context of an aircraft 120A, the present inventive concepts are not limited thereto. Rather, some embodiments may provide verification of the presence of a passenger on board a car, train, bus, or other land-based transportation vehicle 120. Additionally or alternatively, although some examples herein discuss a smartphone 101S, a laptop computer, a tablet computer, or any other portable, wireless electronic device with communications capability may be used.

Furthermore, in some embodiments, the verification/use of the onboard presence of a passenger may be omitted from one or more operations described herein. For example, the arrival of a passenger at a destination, and/or the authorization/verification of a duty-free purchase at a remote location different from the location where the purchase was initiated, may be confirmed/completed in a method that omits the identification/confirmation of the onboard presence of the passenger.

Additionally or alternatively, the passenger may, in some embodiments, provide biometric data by opening/unlocking the wireless electronic device 101, such as by a fingerprint scan or face (and/or retina) scan of the passenger that opens/unlocks the wireless electronic device 101. Accordingly, biometric data that is used/transmitted according to the present inventive concepts to confirm the location/identity of the passenger may be data that is generated/provided when the passenger opens/unlocks the wireless electronic device 101.

A variety of different embodiments of the present inventive concepts have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of all combinations and subcombinations of the embodiments of the present inventive concepts described herein, and of the manner and process of making and using them, and shall support claims to any such combination or subcombination.

It will be understood that when an element is referred to as being "connected," "coupled," or "responsive" to another element, it can be directly connected, coupled, or responsive to the other element or intervening elements may be present. Furthermore, "connected," "coupled," or "responsive" as used herein may include wirelessly connected, coupled, or responsive.

The terminology used herein is for the purpose of describing particular embodiments of the present inventive concepts only and is not intended to be limiting of the present inventive concepts. As used herein, the singular forms "a," "an," and "the" are intended to include the plural forms as well, unless expressly stated otherwise. It will be further understood that the terms "includes," "comprises," "including," and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items. The symbol "/" is also used as a shorthand notation for "and/or."

Unless otherwise defined, all terms (including technical and scientific terms) used herein have the same meaning as commonly understood by one of ordinary skill in the art to which the present inventive concepts belong. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

It will be understood that although the terms "first" and "second" may be used herein to describe various elements, these elements should not be limited by these terms. These terms are only used to distinguish one element from another element. Thus, a first element could be termed a second element, and similarly, a second element may be termed a first element without departing from the teachings of the present inventive concepts.

A variety of different embodiments of the present inventive concepts have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of all combinations and subcombinations of the embodiments of the present inventive concepts described herein, and of the manner and process of making and using them, and shall support claims to any such combination or subcombination.

In the drawings and specification, there have been disclosed example embodiments of the present inventive concepts. Although specific terms are employed, they are used in a generic and descriptive sense only and not for purposes of limitation, the scope of the present inventive concepts being defined by the following claims.

What is claimed is:

1. A method of verifying an onboard presence of a passenger of a transportation vehicle, the method comprising:
   generating, via a wireless electronic device of the passenger while on board the transportation vehicle, different first and second data indicating the onboard presence of the passenger;
   transmitting the different first and second data indicating the onboard presence of the passenger from the wireless electronic device to a server;

initiating, via the wireless electronic device while at a first physical location comprising a store, a transaction to purchase one or more items from the store; and completing, via the wireless electronic device while at a second physical location outside of the store, the transaction in response to verifying an identity and/or location of the passenger, wherein the second physical location comprises a location on board the transportation vehicle, and wherein the verifying comprises performing the generating and the transmitting.

2. The method of claim 1,
wherein the transportation vehicle comprises an aircraft, and
wherein the transmitting is performed by the wireless electronic device while on board the aircraft.

3. The method of claim 1,
wherein the first data indicating the onboard presence of the passenger comprises boarding pass data, and
wherein the generating comprises generating the boarding pass data by using a camera of the wireless electronic device.

4. The method of claim 3, wherein the generating the boarding pass data comprises scanning, via the camera of the wireless electronic device, a bar code or QR code of a physical boarding pass of the passenger.

5. The method of claim 3, wherein the generating the boarding pass data comprises taking a photograph, via the camera of the wireless electronic device, of a physical boarding pass of the passenger.

6. The method of claim 5, wherein the transmitting comprises transmitting the photograph of the physical boarding pass of the passenger from the wireless electronic device to the server.

7. The method of claim 3,
wherein the generating the boarding pass data comprises scanning or photographing a boarding pass via the camera while on board the transportation vehicle, and
wherein the transmitting is performed automatically in response to the scanning or photographing the boarding pass.

8. The method of claim 7, wherein the scanning or photographing the boarding pass comprises:
responsive to opening an application that is resident on the wireless electronic device, automatically initiating the camera to scan or photograph the boarding pass.

9. The method of claim 7, wherein the scanning or photographing the boarding pass comprises:
prompting, via a graphical user interface (GUI) of the wireless electronic device, the passenger to scan or photograph the boarding pass via the camera.

10. The method of claim 9, wherein the prompting comprises:
displaying, via the GUI, a user-selectable button that initiates the camera to scan or photograph the boarding pass.

11. The method of claim 1,
wherein the second data indicating the onboard presence of the passenger comprises an identification of a local-area-network access point that is on board the transportation vehicle, and
wherein the generating comprises generating the identification of the local-area-network access point by using the wireless electronic device to access the local-area-network access point.

12. The method of claim 11,
wherein the local-area-network access point comprises a Wi-Fi access point that is on board the transportation vehicle, and
wherein the generating comprises generating an identification of the Wi-Fi access point by using the wireless electronic device to access a service provided via the Wi-Fi access point.

13. The method of claim 11, wherein the generating the identification of the local-area-network access point comprises:
responsive to opening an application that is resident on the wireless electronic device, communicating with the local-area-network access point and storing the identification of the local-area-network access point.

14. The method of claim 1,
wherein the first data indicating the onboard presence of the passenger comprises biometric data of the passenger, and
wherein the generating comprises generating the biometric data by using a camera or other sensor of the wireless electronic device.

15. The method of claim 1,
wherein the second data indicating the onboard presence of the passenger comprises location data of the transportation vehicle, and
wherein the generating comprises generating the location data of the transportation vehicle by using a Global Positioning System (GPS) receiver of the wireless electronic device.

16. The method of claim 15,
wherein the transportation vehicle comprises an aircraft, and
wherein the location data comprises altitude data of the aircraft.

17. The method of claim 16, wherein the transmitting is performed by the wireless electronic device while bypassing any local area network of the aircraft, after the passenger disembarks from a flight of the aircraft.

18. The method of claim 1,
wherein the transportation vehicle comprises an aircraft, wherein the second data indicating the onboard presence of the passenger comprises altitude data of the aircraft, and
wherein the generating comprises generating the altitude data of the transportation vehicle by using a barometer of the wireless electronic device.

19. The method of claim 1,
wherein the first data indicating the onboard presence of the passenger comprises boarding pass data, and
wherein the second data indicating the onboard presence of the passenger comprises an identification of a local-area-network access point that is on board the transportation vehicle.

20. The method of claim 19, wherein the transmitting comprises transmitting first and second time stamps indicating when the boarding pass data and the identification of the local-area-network access point, respectively, were generated by the wireless electronic device.

21. The method of claim 1,
wherein the first data indicating the onboard presence of the passenger comprises boarding pass data, and
wherein the second data indicating the onboard presence of the passenger comprises location data of the transportation vehicle.

22. The method of claim 21, wherein the transmitting comprises transmitting first and second time stamps indicating when the boarding pass data and the location data, respectively, were generated by the wireless electronic device.

23. The method of claim 1, further comprising:
accessing, via a web page or an application that is resident on the wireless electronic device, a database to verify whether the passenger has purchased a maximum amount of duty-free purchases for a particular jurisdiction.

24. The method of claim 1, further comprising:
transmitting third data indicating that the passenger has arrived at a destination of the transportation vehicle,
wherein the transmitting third data comprises connecting the wireless electronic device to a Wi-Fi access point at the destination.

25. The method of claim 24,
wherein the destination comprises an arrival airport, and
wherein the transmitting third data further comprises:
transmitting an identification of the Wi-Fi access point at the arrival airport from the wireless electronic device, to confirm that the passenger has arrived at the arrival airport.

26. The method of claim 1, further comprising:
transmitting biometric data of the passenger from the wireless electronic device at a departing location of the transportation vehicle and at a destination of the transportation vehicle, to confirm that another person is not using the wireless electronic device.

27. The method of claim 26,
wherein the transportation vehicle comprises an aircraft, and
wherein the departing location and the destination comprise a departing airport of the aircraft and an arrival airport of the aircraft, respectively.

28. A computer program product comprising:
a non-transitory computer readable storage medium comprising computer readable program code therein that when executed by a processor causes the processor to perform operations comprising:
generating, via a wireless electronic device of a passenger while on board a transportation vehicle, different first and second data indicating an onboard presence of the passenger;
transmitting, via a wireless communications link, the different first and second data indicating the onboard presence of the passenger from the wireless electronic device to a server that is remote from the transportation vehicle;
initiating, via the wireless electronic device while at a first physical location comprising a store, a transaction to purchase one or more items from the store; and
completing, via the wireless electronic device while at a second physical location outside of the store, the transaction in response to verifying an identity and/or location of the passenger,
wherein the second physical location comprises a location on board the transportation vehicle, and
wherein the verifying comprises performing the generating and the transmitting.

29. A wireless electronic device comprising:
a processor configured to generate different first and second data indicating a presence of a passenger on board a transportation vehicle; and
a transceiver configured to transmit, via a wireless communications link, the different first and second data indicating the presence of the passenger from the wireless electronic device to a server that is remote from the transportation vehicle,
wherein the wireless electronic device is configured to initiate, while at a first physical location comprising a store, a transaction to purchase one or more items from the store,
wherein the wireless electronic device is further configured to complete, while at a second physical location outside of the store, the transaction in response to verifying an identity and/or location of the passenger,
wherein the second physical location comprises a location on board the transportation vehicle, and
wherein the verifying comprises generating and transmitting the different first and second data.

30. The wireless electronic device of claim 29, further comprising a camera, wherein the processor is further configured to generate the first data by using the camera to capture an image of a boarding pass of the passenger.

* * * * *